United States Patent [19]

Billger et al.

[11] Patent Number: 5,131,851

[45] Date of Patent: Jul. 21, 1992

[54] VEHICLE MOUNTED BATTERY CONNECTOR ASSIST UNIT

[75] Inventors: Steven C. Billger, Celina; Nita L. Watercutter, Sidney, both of Ohio

[73] Assignee: Crown Equipment Corporation, New Bremen, Ohio

[21] Appl. No.: 754,609

[22] Filed: Sep. 4, 1991

Related U.S. Application Data

[63] Continuation-in-part of Ser. No. 588,244, Sep. 26, 1990, abandoned.

[51] Int. Cl.⁵ .............................................. H01R 33/00
[52] U.S. Cl. .................................... 439/34; 439/310; 439/372; 439/378; 439/892
[58] Field of Search ................ 104/34; 439/296, 297, 439/310, 338, 341, 342, 372, 374, 378, 380, 144, 147, 259, 266, 135-143, 145-146, 573, 892, 34, 345

[56] References Cited

U.S. PATENT DOCUMENTS

| | | | |
|---|---|---|---|
| 884,102 | 4/1908 | Norden | 439/573 |
| 1,566,089 | 12/1925 | Harding | 104/34 |
| 2,510,944 | 9/1946 | Auerbach | 439/378 |
| 2,590,559 | 8/1950 | Miller | 439/892 X |
| 2,725,946 | 12/1955 | Welter | 254/8 R |
| 2,802,540 | 8/1957 | Brookbank | 104/34 |
| 2,823,621 | 2/1958 | Arnot | 104/34 |
| 3,659,248 | 4/1972 | Mann et al. | 439/144 |
| 3,799,063 | 3/1974 | Reed | 104/34 |
| 4,040,698 | 8/1977 | Ortiz | 439/342 X |
| 4,055,260 | 10/1977 | Tamas | 104/34 X |

FOREIGN PATENT DOCUMENTS

| | | | |
|---|---|---|---|
| 2435705 | 5/1973 | Fed. Rep. of Germany | 439/296 |
| 838834 | 6/1981 | U.S.S.R. | 439/296 |
| 2169153 | 7/1986 | United Kingdom | 439/310 |

OTHER PUBLICATIONS

"Module Mating Tool for ZIF Connector", IBM Technical Bulletin, vol. 29, No. 11, Apr. 1987, p. 5057.
"Apparatus for Testing Modular Adapters", Western Electric, Jan. 1983, pp. 9-10, Hutchins.
"SB Connectors", Section 4, Anderson Power Products, pp. 10-13 and Section 3, pp. 7-10.
"SA Connector", Brad Harrison Company.

Primary Examiner—Larry I. Schwartz
Assistant Examiner—Julie R. Daulton
Attorney, Agent, or Firm—Biebel & French

[57] ABSTRACT

A battery connector assist unit comprising a base having means to secure a battery connector first part thereto and a slidable member interconnected to the base with the slidable member having a slide base having an upper surface and a lower surface. The lower surface is adjacent to the base. The slidable member also has a pair of smooth sided cantilevered beams extending therefrom for temporarily retaining a battery connector second part and for transmitting force from the slidable member to the connector. The slidable member has a handle member easily accessible to assist in removing the connector parts into and out of mating relationship. In one embodiment of the invention, the base has at least one slot therein and a slidable member has means to engage at least one such slot, while in another embodiment of the invention the slidable member has at least one slot therein and the base has means to engage at least one such slot. In the preferred embodiment of the invention, a cover plate is provided.

21 Claims, 10 Drawing Sheets

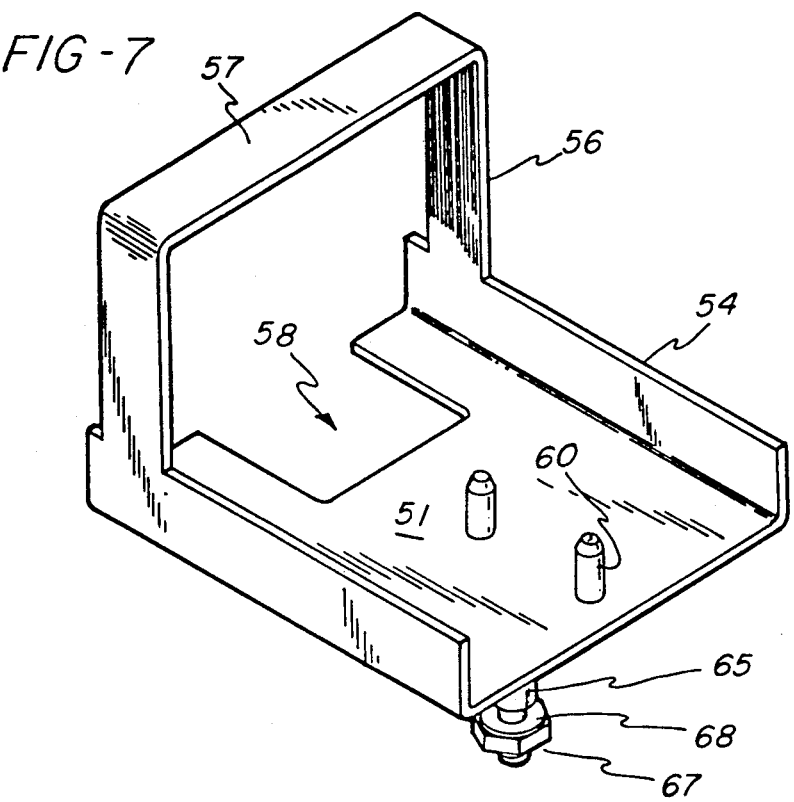
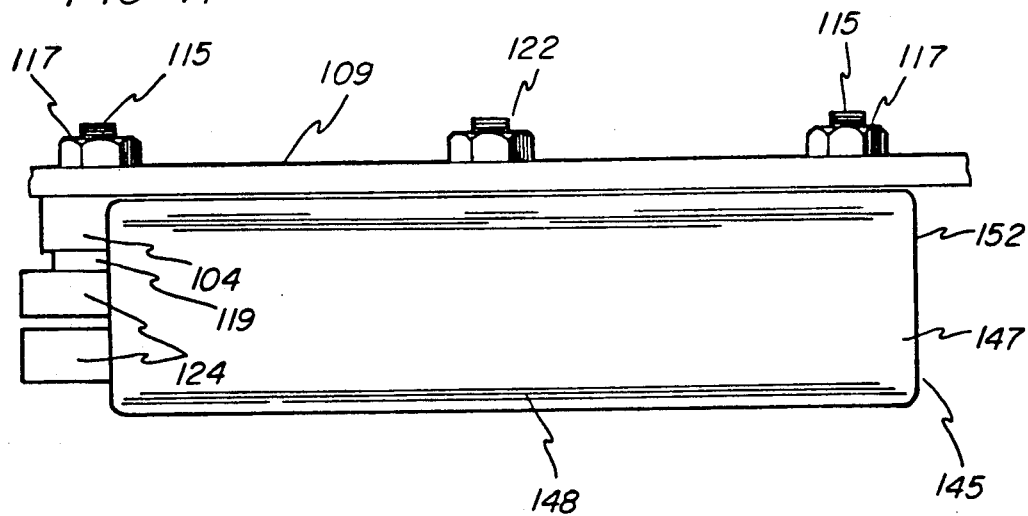

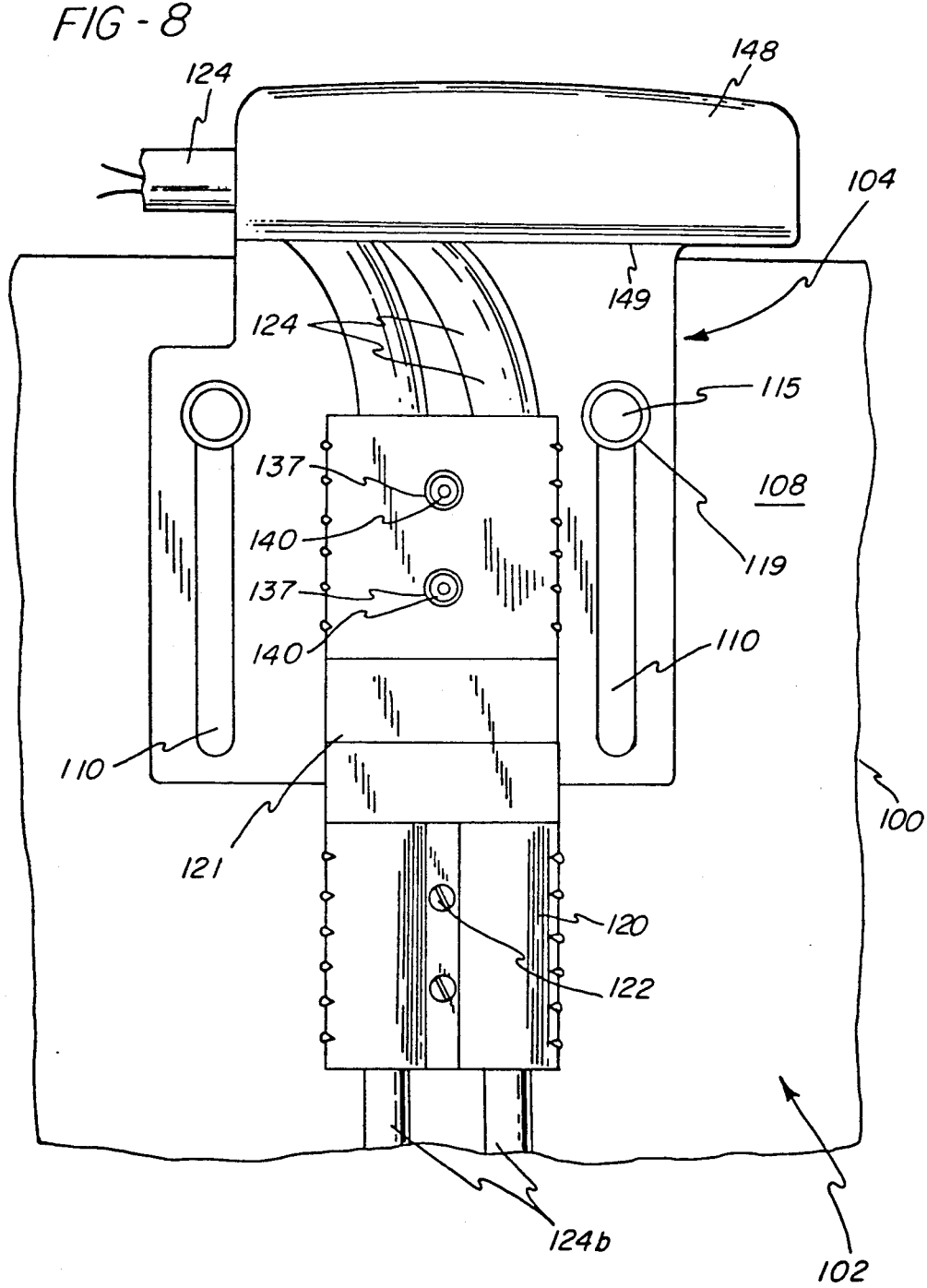

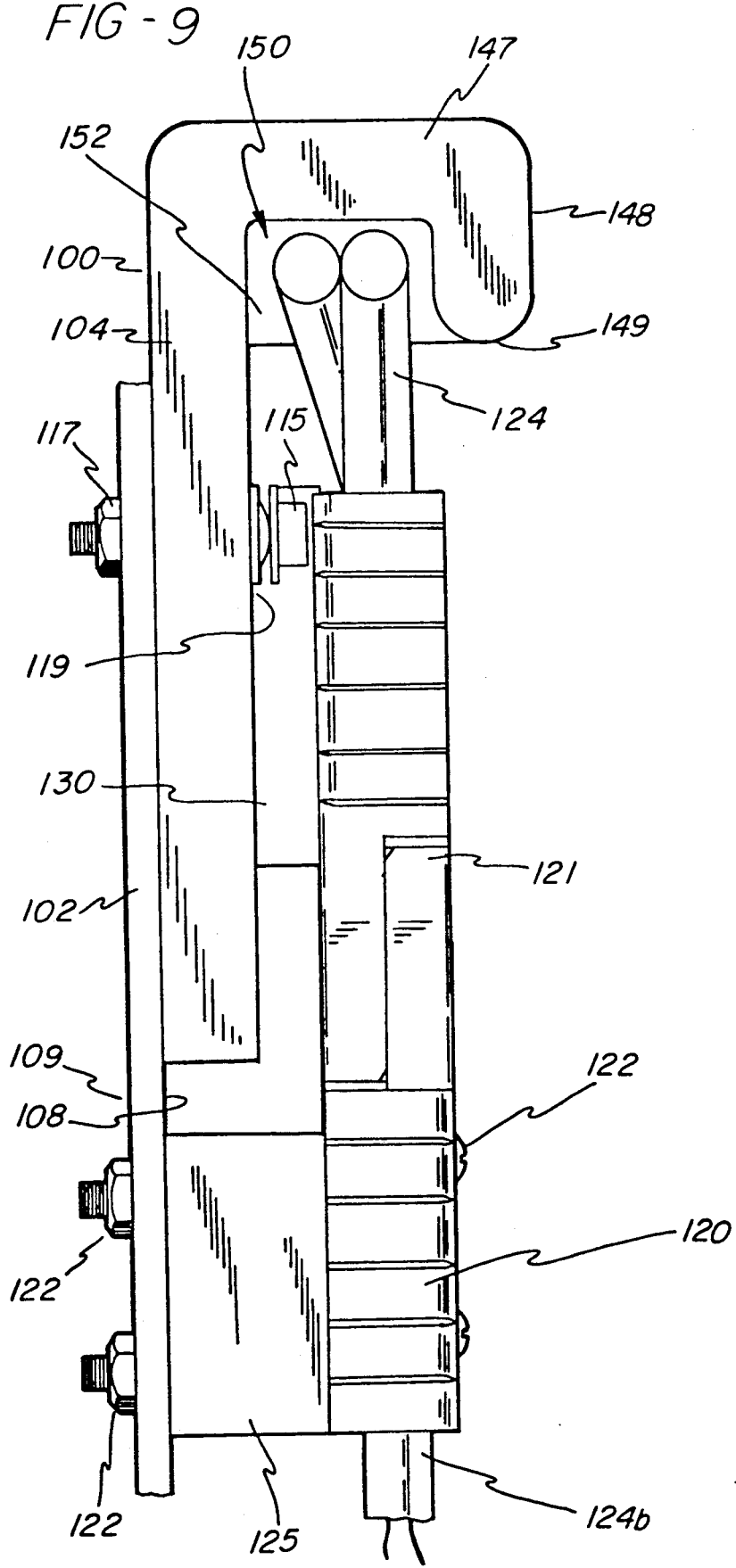

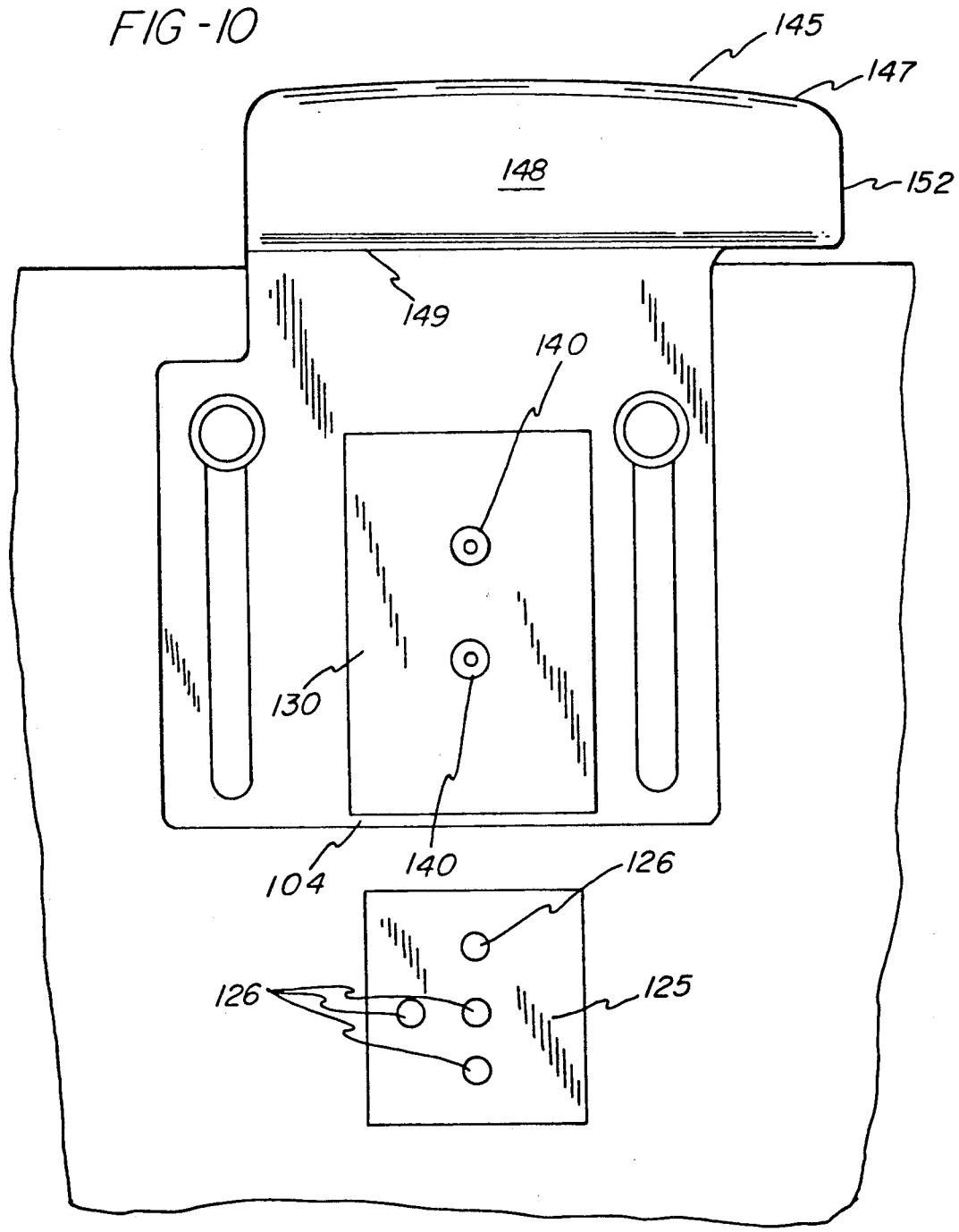

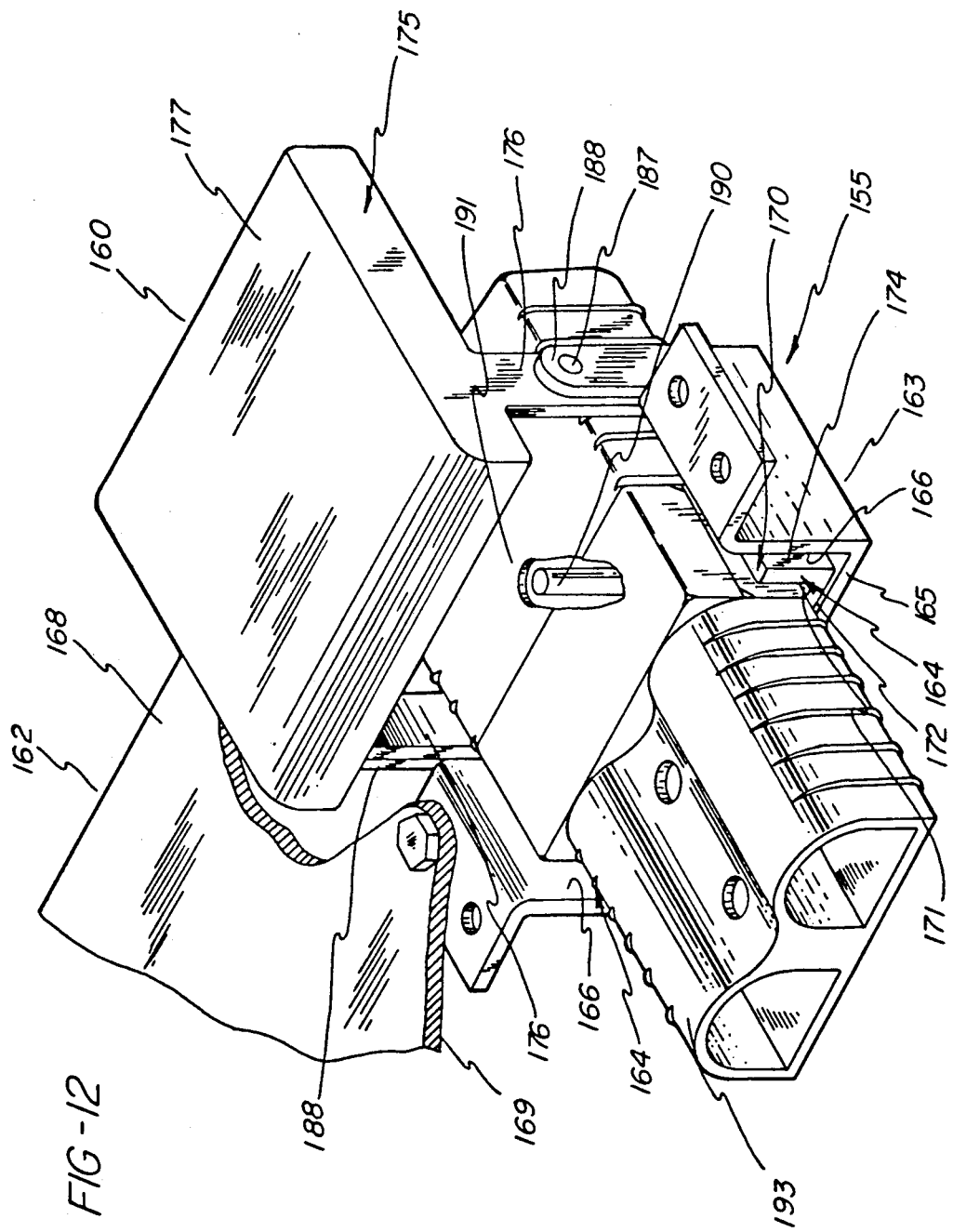

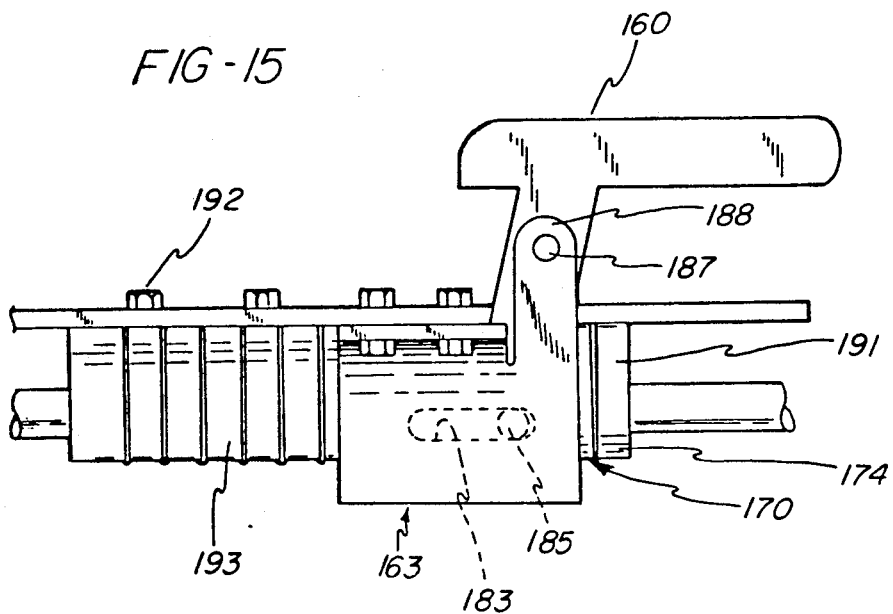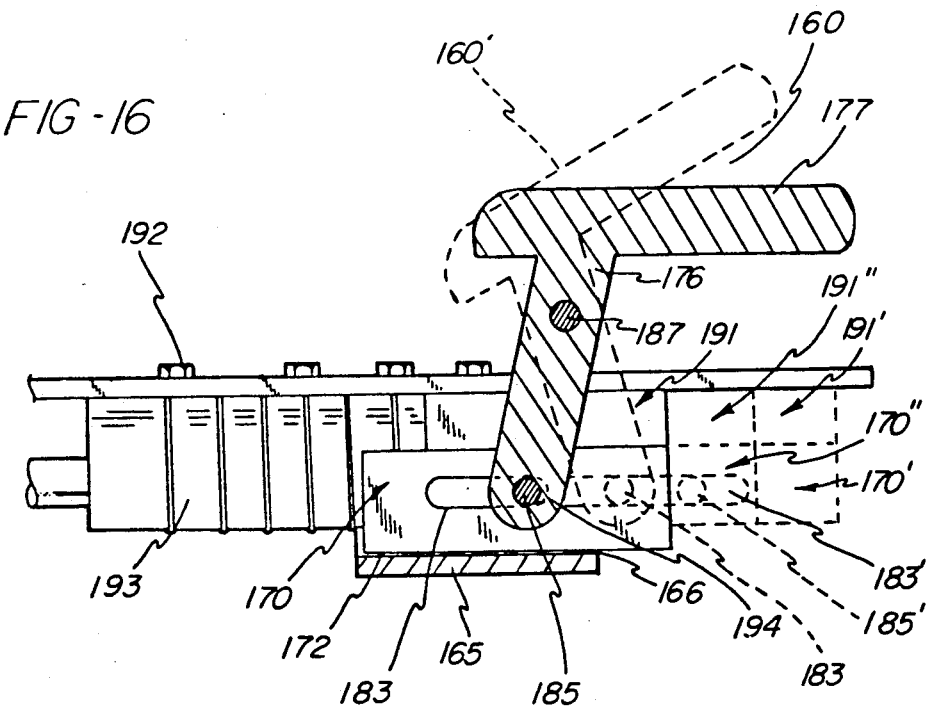

VEHICLE MOUNTED BATTERY CONNECTOR ASSIST UNIT

RELATED APPLICATION

This application is a continuation-in-part of application Ser. No. 07/588,244 filed Sep. 26, 1990, abandoned.

BACKGROUND OF THE INVENTION

This invention relates to a method and apparatus to assist connecting and disconnecting high capacity batteries to and from battery powered vehicles, such as lift trucks and other materials handling vehicles.

In a typical warehouse operation, battery powered vehicles use battery packages that are often charged separately from the vehicle. For example, a lift truck may use a battery package for about 8 hours, and at the end of a shift, the battery package will be replaced with a freshly charged unit and the used battery package will be placed on a charger, thus permitting the vehicle to begin the next shift with a full source of power. Often, a given facility will use vehicles from different manufacturers, with all of the vehicles using the same batteries. Thus, a battery package may be used on one type of vehicle, recharged and then used on a vehicle from another manufacturer. Clearly, there is a need for an assist device separate from the connector that does not deter the standardization of the connectors used between the battery and the vehicle.

The most common connectors used between a rechargeable battery and a vehicle in the United States, and the one recommended by several battery manufacturers, are a pair of SB or SBX Series connectors made by Anderson Power Products, or an equivalent by other manufacturers. In other countries the SBX Series or similar connectors are often used. Two identical connectors are used, the first is connected to the cables attached to the vehicle's electrical system, the second is connected to the cables attached to the battery.

Since these connectors carry up to 350 amperes of current, they are often difficult to connect and disconnect, especially when this operation is carried out in a confined space. This is due to the size of the contacts and the spring loading applied to those contacts.

To assist with disconnecting the connector components, some connector manufacturers have developed disconnect aids or devices. One device is merely a handle bolted onto the battery connector. Another device is a hinged handle attached to the battery connector and a cooperating mounting component attached to the vehicle connector whereby rotation of the hinged handle moves the connector components together or apart.

The connectors themselves include a body having a pair of longitudinally extending channels or tubes through which the cables extend and which shield the contacts attached at the ends of the cables from inadvertent shorting. Between and integral with the channels is a central portion in which is formed two or more openings for receiving the mounting hardware for the disconnect devices.

The first or vehicle connector is often securely attached to the vehicle. However, the configuration of a bolted handle or other disconnect hardware, when attached to the second or battery side connector, can sometimes prevent that connector from being installed when the battery is used on other vehicles or in other applications because of space limitations, thereby necessitating the removal of the handle prior to using that particular battery. What is needed is a method and apparatus that permits the battery connector to be easily connected or disconnected from the vehicle connector without requiring any additional hardware to be mounted to the battery connector.

SUMMARY OF THE INVENTION

This invention relates to a battery connector assist unit which can aid in disconnecting or connecting a battery connector, but which does not have to be fixedly attached to the battery side connector.

One of the characteristics of the SB or SBX Series connectors is that they are provided with a set of openings between the cables, which openings are intended to accept mounting hardware, either for a handle or other type of disconnect device. For the SB Series connector, a pair of longitudinally spaced holes are formed; for the SBX Series connector, there are four holes. The present invention makes use of these holes in the following manner. The electrical connector attached to the vehicle is usually mounted in fixed relation to the vehicle by means of mounting bolts extending through these holes. A movable or slidable member, also associated with the vehicle, is provided with upstanding beams that are spaced apart and arranged to engage the holes in the battery connector. The beams are typically smooth sided cylindrical pins, but they can be of any shape to match the opening in the connector. A handle or lever is associated with the slidable member to assist in moving it longitudinally of the connectors. When the battery connector is placed over these beams, force can be applied to the slidable member to move the battery connector either forward to connect the two components, or rearward to assist in disconnecting the battery connector from the vehicle connector.

More specifically, the battery connector assist unit of this invention comprises a base having means for securing a first or vehicle side component of a battery connector and a slidable member interconnected to the base comprising a handle member, and a slide base having an upper surface and a lower surface, the lower surface being adjacent to the base and with the slidable member being slidable over the base responsive to force exerted on the handle member, the slidable member having means for retaining a second or battery side component of a battery connector.

In one embodiment of the invention, the base includes means forming at least one slot therein, with the slidable member including means for engaging at least one slot for maintaining alignment between the base and the slidable member. The base also includes means for aligning a battery connector first part with a battery connector second part. The slidable member has side walls being spaced apart enough to accommodate a battery connector second part therebetween. Preferably the slidable member is located directly adjacent the base. This device also includes means for retaining a battery connector second part which includes at least one beam extending perpendicularly from the upper surface. A cover plate may be attached to this first embodiment of the invention a spaced distance above the base. Further, the base of this embodiment has means for regulating the closure of the cover plate.

In a second embodiment of the invention, the slidable member has at least one slot therein, with the base having means for engaging at least one slot. The base includes means for aligning a battery connector first part with a battery connector second part, while the slidable member includes means for aligning a battery connector second part with a battery connector first part, preferably the slidable member is located directly adjacent the base.

In a third embodiment of the invention, the slidable member is positioned above a base channel member, which base channel member is preferably secured to the underside of the base. The slidable member has side walls being spaced apart enough to accommodate a battery connector second part therebetween. This device also includes means for retaining a battery connector second part which includes at least one beam extending perpendicularly from the surface of the slidable member. The battery connector first part is secured to the base. A handle pivotally connected to a handle engaging portion of the channel member pivots so as to allow a slot engagement means to slide along base channel member. A slot formed in the side wall of the slidably interconnected member provides additional access when retaining battery connector second part.

In each of the embodiments of the invention, the means for retaining a battery connector second part comprise at least one beam extending perpendicularly from the upper surface of the slidable member. Preferably there are at least two such beams.

Accordingly, it is an object of this invention to provide a vehicle mounted battery connector assist unit for use in battery powered vehicles which remains attached to the vehicle and obviates the need to use handles or additional components attached to the battery portion of the battery connector.

It is another object of this invention to provide a vehicle mounted battery connector assist unit which permits the integration of the battery cable, connector, and handle relatively into the vehicle envelope.

It is yet another object of this invention to provide a vehicle mounted battery connector assist unit which provides quick and effective connection, as well as disconnection, of the two portions of a battery connector.

Other objects and advantages of the invention will be apparent from the following description, the accompanying drawings and the appended claims.

BRIEF DESCRIPTION OF THE DRAWINGS

FIG. 7 is a perspective view of the slidable member shown in FIG. 5.

FIG. 8 is a front elevational view of a second embodiment of this invention.

FIG. 9 is a side elevational view taken from the left side of FIG. 8.

FIG. 10 is similar to FIG. 8, but with the battery connector removed.

FIG. 11 is a plan view of the second embodiment.

FIG. 12 is a perspective view of a third embodiment of the invention.

FIG. 15 is a side elevational view thereof.

FIG. 16 is a vertical sectional view taken along line 16—16 of FIG. 13.

DESCRIPTION OF THE PREFERRED EMBODIMENT

Figure 1:
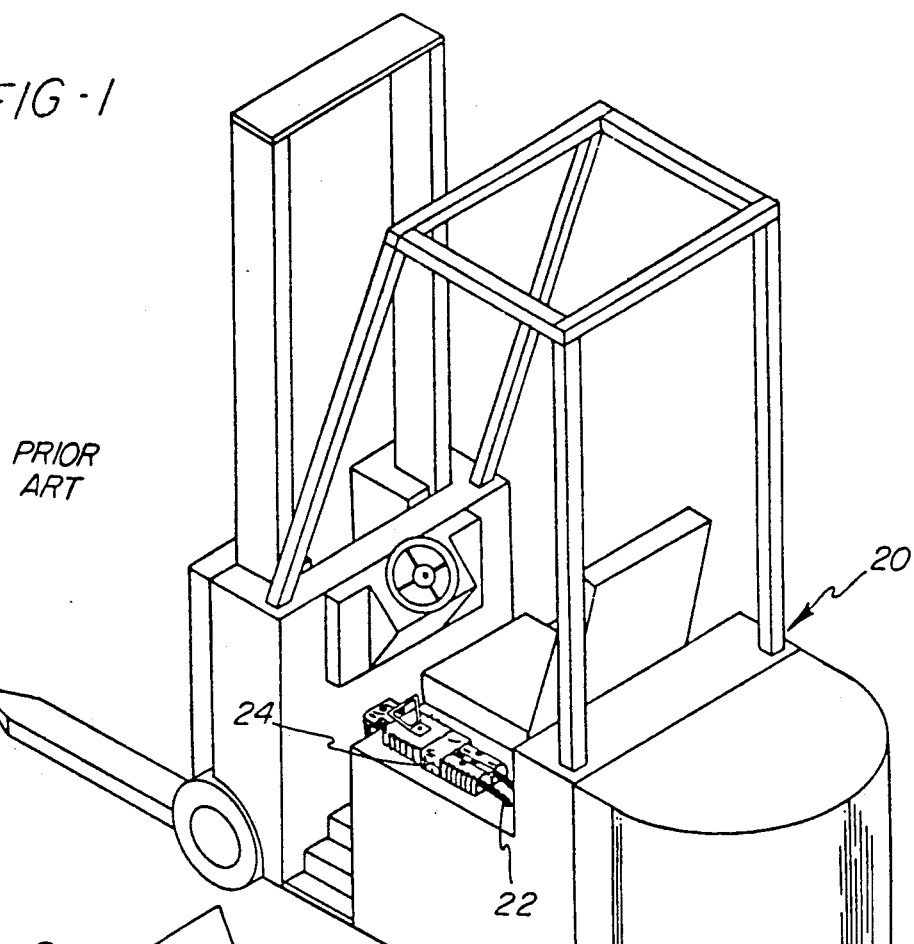
FIG. 1 is a perspective view of a lift truck which is representative of the type of vehicle that includes battery connectors, with the battery connector illustrative of the prior art.

Referring now to the drawings, and particularly to FIG. 1, a fork lift truck of the type which includes a battery connector assist unit is shown, with the vehicle being designated by the numeral 20, the battery cable designated by the numerals 22 and 22b and the battery connector being designated by the numeral 24. The battery connector shown is a type SB connector, which is an industry standard in the United States for many electrically powered materials handling vehicles.

Figure 2:
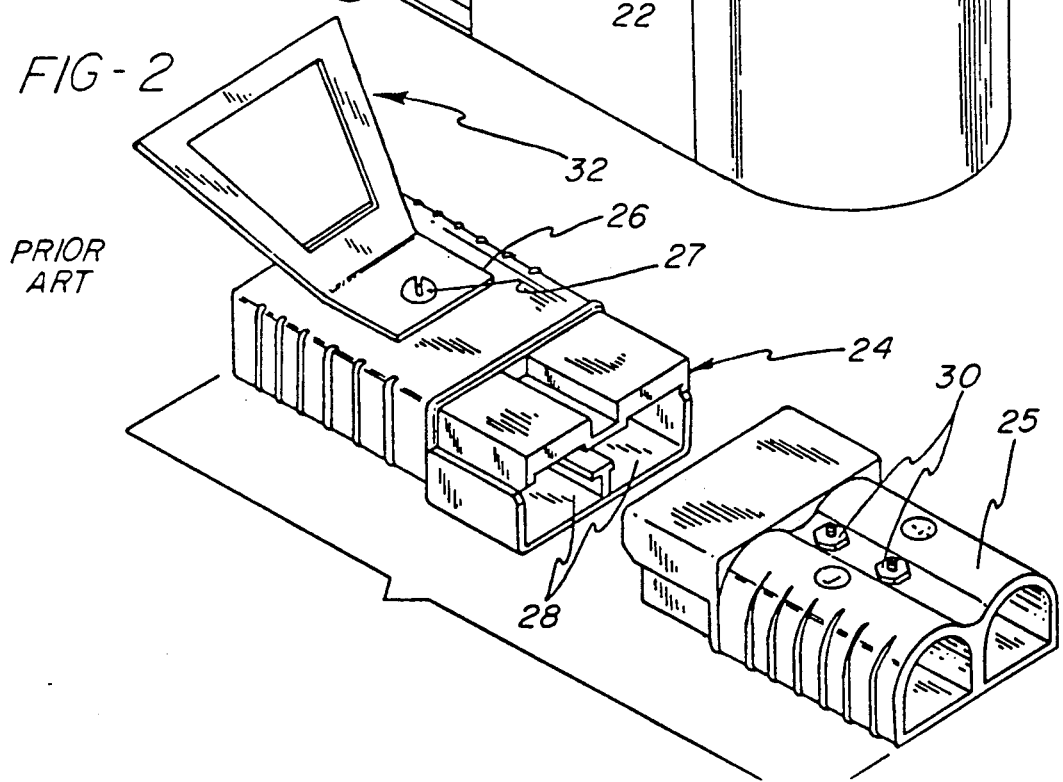
FIG. 2 is a perspective view of a battery connector and battery connector assist unit representative of the prior art.

As illustrated in FIG. 2, the battery connector 24 comprises a connector first part 25 connected to the vehicle's electrical system and a connector second part 26 connected to a battery package. The connector second part has apertures 27 and means for electrical engagement 28 with the connector first part. Means for fixedly securing the connector first part to the vehicle are provided, typically in the form of screws 30 or bolts. A prior art battery connector handle 32 is shown as being secured to the connector second part at apertures 27.

Figure 4:
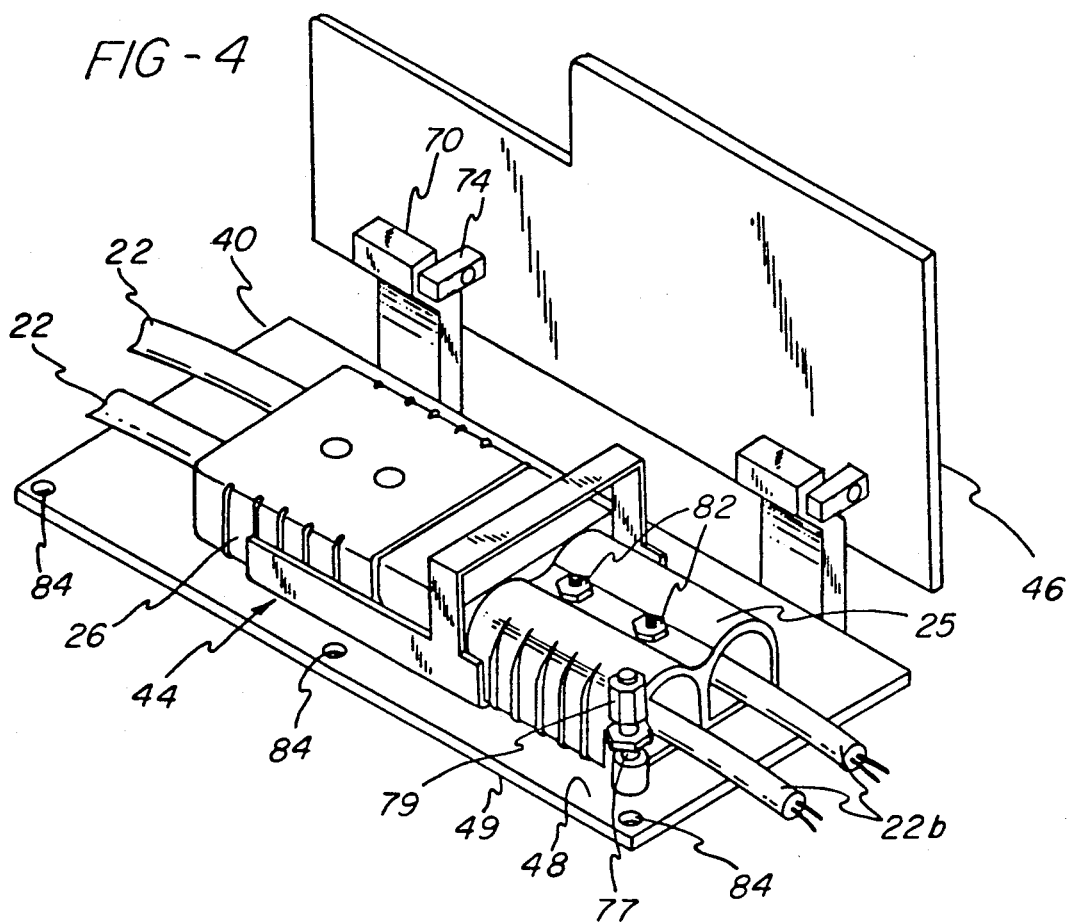
FIG. 4 is a perspective view similar to FIG. 3, but showing the cover being in an open position.
Figure 3:
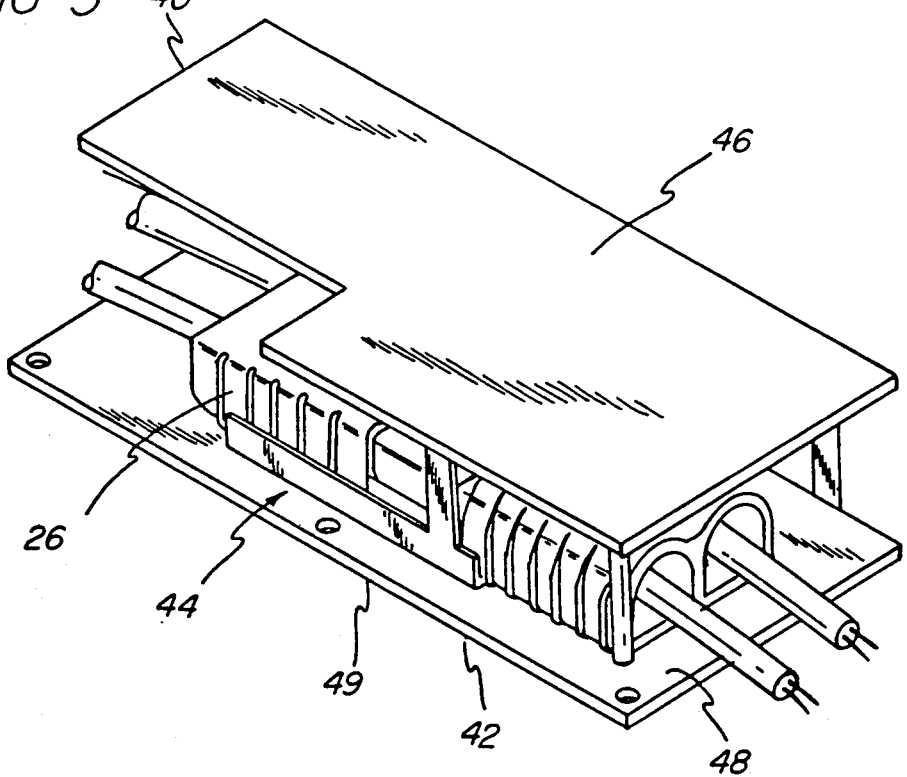
FIG. 3 is a perspective view of one embodiment of the invention with the cover being closed.

As shown in FIGS. 3 and 4, the preferred embodiment of the invention discloses a battery connector assist unit designated generally by the numeral 40. The improved battery connector assist unit comprises a planar base member 42 and a slidably interconnected member 44. A cover is attached to the base a spaced distance above such base by cooperative closure means which also serve to regulate the closure of the cover plate 46.

Base member 42 includes a base upper surface 48 and a base lower surface 49. Slidable member 44 includes a slide base 50 having an upper surface 51 as well as a lower surface 52, which lower surface preferably is directly adjacent the base member 42. The slidable member also preferably includes a pair of side walls spaced apart enough to accommodate a battery connector second part therebetween. Extending across the slidable member at a height greater than the height of a connector first part is handle 55, preferably having side walls 56 and having a slide transversing member 57. Slide base 50 also has a channel 58 formed therein.

Figure 5:
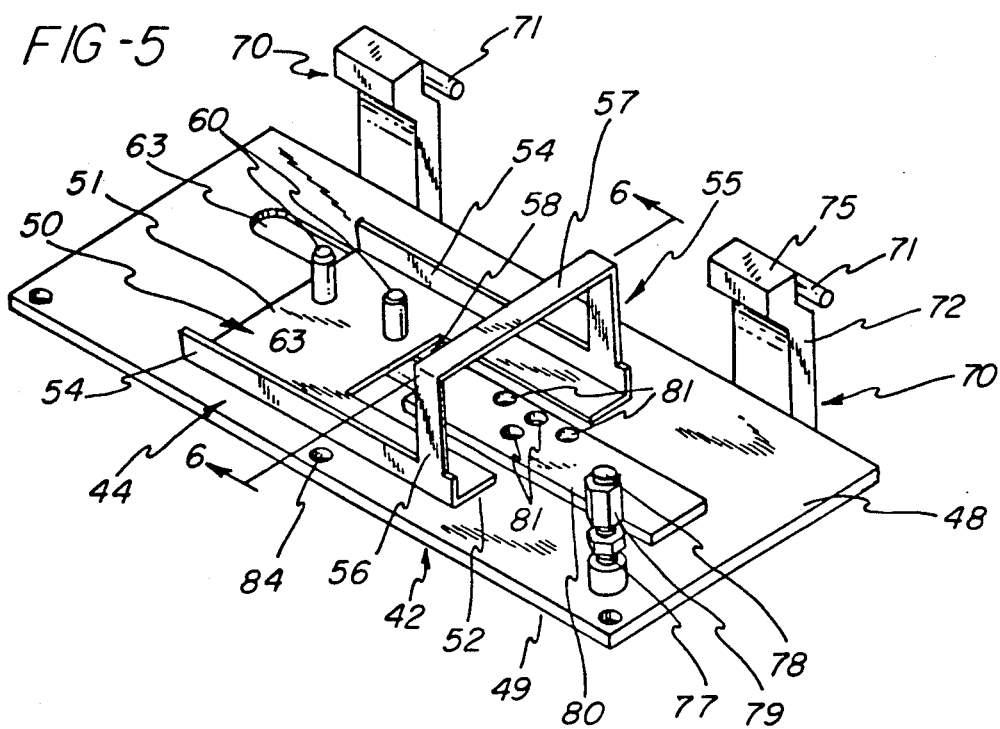
FIG. 5 is a perspective view similar to FIG. 4, but with both the cover and the battery connector being removed.
Figure 6:
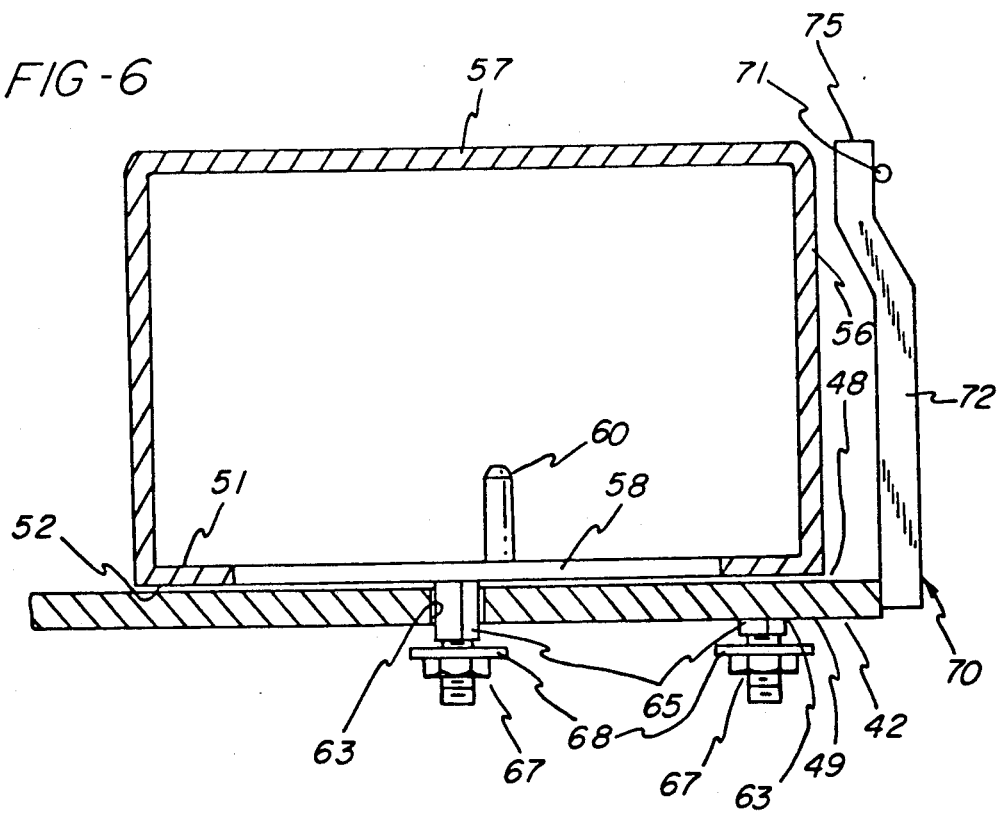
FIG. 6 is a vertical sectional view taken along line 6—6 of FIG. 5.
Figure 13:
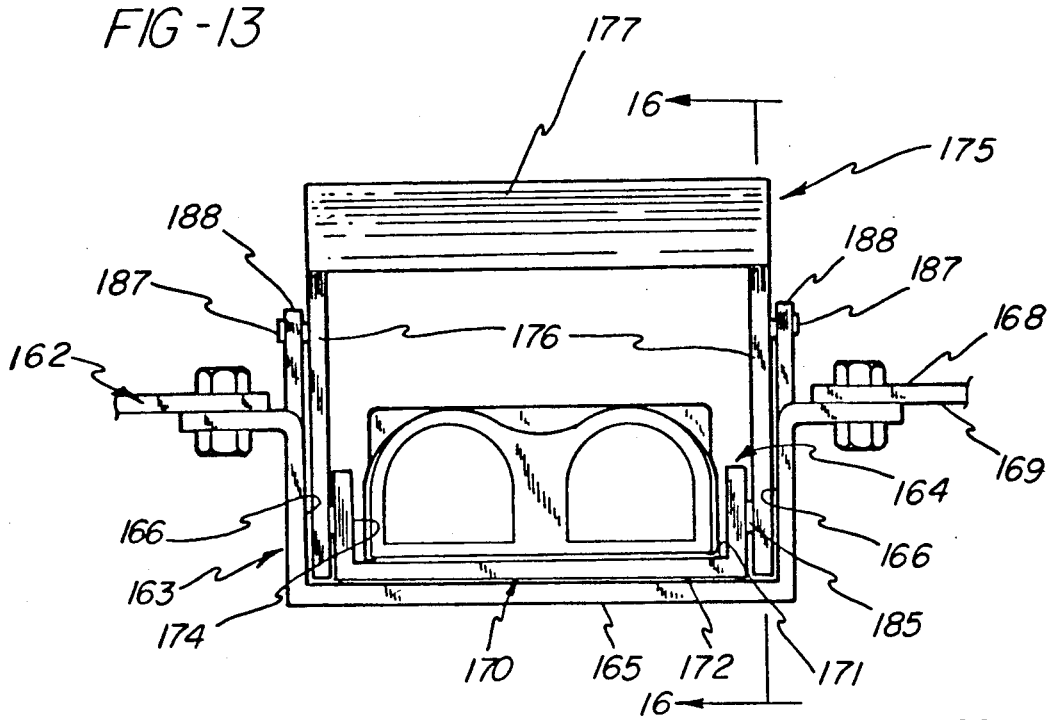
FIG. 13 is a front elevational view of the third embodiment of the invention.
Figure 14:
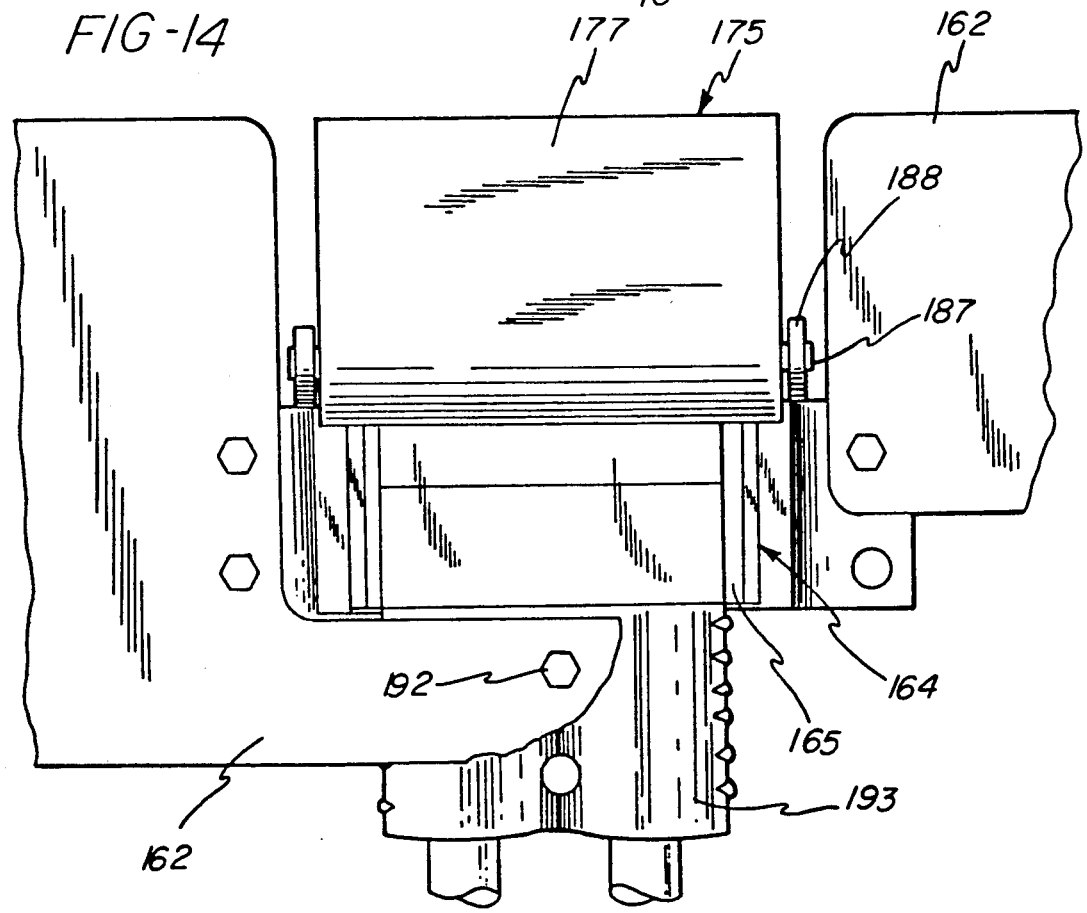
FIG. 14 is a top plan view of the third embodiment of the invention.

Means for temporarily retaining a battery connector second part 60 are shown in FIGS. 5, 6, and 7 as preferably being located along the longitudinal axis of the slidable member 44 and located the same distance apart as apertures 27 in the connector second part 26. Preferably these projections are in the form of smooth sided, cantilevered force transmitting beams which assist in the positioning of the connector second part onto the slidable member 44. Preferably these projections 60 are of a height no greater than the height of the connector second part.

As can be seen by comparing FIGS. 5 and 6, a pair of slots 63 extend in parallel relationship along base member 42. Slot engaging means 65 extend downwardly from slide lower surface 52 through slots 63 and permit slidable member 44 to be retained relative to base member 42 by slide retention means 67 which may be in the form of a screw-threaded nut. The slot engaging means 65 is of a diameter slightly less than that of the width of slot 63. Additionally, a flat washer 68 may be placed between retention means 67 and base lower surface 49.

Referring again to FIGS. 4, 5 and 6, the cover plate 46 is attached to base 42 by means to regulate the closure of the cover plate. First cooperative closure means 70 are directly secured to base 42 and have a bar 71 projecting from respective side faces 72. An aperture 73 associated with second cooperative closure means 74 has bar 71 inserted therein. The extent of closure of the cover plate 46 is controlled by third cooperative closure means 77 which is preferably formed of a female threaded stud welded to base 42, topped by a jam nut, a hex shaped threaded end, and a rubber tip 78. The hex shaped threaded end 79 may be rotated relative to the base 42 so as to permit adjustment to the height of the closure means 77. Third cooperative closure means is positioned perpendicular to base member 42. The height of third cooperative closure means should permit the cover 46 to be positioned parallel to base member 42 in the closed position as shown in FIG. 3, thereby integrating the entire unit or assembly into the vehicle. The third cooperative closure means 77 preferably has a rubber tip 78 to reduce noise associated with the vibration of the cover plate against the metallic third cooperative closure means.

Referring again to FIGS. 4 and 5, first connector alignment means 80 in the form of a plate is shown directly adjacent base member 42. First connector alignment means 80 have a plurality of apertures 81 therein which correspond to the alignment in various connector first parts, since not all connector first parts have connecting apertures in them which are the same orientation. For example, FIG. 4 discloses fastening means 82 securing the connector first part having the aperture alignment shown to base member 42. Base member 42 also has a plurality of weldment retaining means 84 which permit base member 42 to be secured to an existing fork lift 20 in the utilization of this invention. Alternatively the base member 42 could be incorporated as a weldment into the design of a fork lift similar in design to that shown in FIG. 1.

In this first embodiment of the invention, in actual operation a connector first part 25 is aligned on first connector alignment means 80 and secured thereto by fastening means 82. As shown in FIG. 5, the width of first connector alignment means 80 is less than the width associated with channel 58. Beams 60 are passed into the apertures 27 in connector second part 26 so as to temporarily retain the battery connector second part to the slidable member. The battery connector is joined by moving slidable member 44 through slots 63 toward first connector alignment means 80. The height of first connector alignment means 80 compensates for the height associated with slide base 50 to permit efficient insertion of the cooperating components of the battery connector. To unplug the battery connector, the handle of the slidable member is merely slidable displaced away from the first connector alignment means, thereby uncoupling the battery connector. The battery connector second part may then be easily removed from beams 60 by lifting the connector off the beams, the battery replaced and the new battery connector second part reinserted onto slidably interconnected member 44.

A modified embodiment of the invention is shown in FIGS. 8, 9, 10 and 11 and is designated generally by the numeral 100. In this embodiment, the sliding occurs with respect to a vertical axis. This embodiment finds particular application in vehicles where there is no auxiliary switch to cut off the power for the vehicle in case of an emergency. This modified embodiment includes a vertical base member 102 and a slidably interconnected member 104. The base member 102 has a base outer surface 108 and a base inner surface 109. Formed in the slidably interconnected member 104 are at least one and preferably two slots 110, disposed vertically therein.

Slot engaging means 115, which could be in the form of a bolt are secured in cooperation with slide retention means 117 through both base member 102 and slidable member 104. As shown, slidable member 104 is preferably directly adjacent the base outer surface 108. In this embodiment of the invention, spring means 119, shown in the form of a curved spring washer, are positioned between the head of a slot engaging means 115 and slidable member 104 to reduce the vibration and noise associated with the sliding member.

The connector first part 120, also known as the drive side or portion of the connector is shown connected to the connector second part 121, also known as the battery side or portion of the connector. Battery cable 124b is shown entering the first part of the battery connector, while cable 124 enters the second part of the battery connector. A first connector alignment means 125 is positioned between connector first part 120 and base outer surface 108, such that the connector first part is spaced a distance apart from the base 102. Apertures 126 in the first connector alignment means 125 are aligned with the apertures in the connector first part so as to permit the securing of the connector first part to the base member by fastening means 122.

Second connector alignment means 130 is shown as projecting from slidable member 104, such that adjacent connector second part 121 is spaced a distance apart from the base 102. The second connector alignment means may be formed integral of slidable member 104, or it could be fabricated as a distinct component. Second connector alignment means 130 cooperates with first connector alignment means 125, although the thickness of alignment means 125 is greater than alignment means 130. For example, the thickness of the second connector alignment means 130 plus the thickness of the slidable member from which it projects is approximately equal to the thickness of the first connector alignment means 125.

Connector second part 121 has a plurality of connector apertures 137 therein, through which may be placed projections 140. Preferably these means for retaining the battery side of a battery connector 121 extend normal the slidable member 104. These projections 140 are positioned to permit the connector to be aligned with the connector first part.

A handle portion 145 atop slidable member 104 includes a top surface portion 147, an outer front surface 148 with the outer front surface 148 having a front surface bottom 149. A cavity or channel 150 is provided inside a portion of the handle member 145 and is of a width so as to permit battery cable 124 to pass therethrough. At the opposite end of the handle portion, is a handle end wall 152. The handle, as can be best seen in FIG. 9, overlaps the components of the battery connector 120 and 121 in the operative embodiment.

In the actual operation of this embodiment, the connector first part is secured to the base by fastening means 122. The connector second part 121 is placed over the projections 140 with battery cable 124 extending upwardly into the cavity 150 of handle 145. When the connector second part is thus to be engaged, the slot engaging means 115 is oriented towards the bottom of slots 110. The downward depression of the handle 145 causes the components of the battery connector to be joined. Similarly, grasping the handle 145 and pulling upwardly thereon disconnects the electrical circuit. Optimally, the first connector alignment means 125 and second connector means 130 are of heights such that an efficient insertion of the battery connector components can be made.

Another modified embodiment of the invention is shown in FIGS. 12, 13, 14, 15 and 16 and is designated generally by the numeral 160. In this embodiment, the sliding preferably occurs with respect to a horizontal axis. This embodiment finds particular application in vehicles, where there is no auxiliary switch to cut off the power for the vehicle in case of an emergency. This modified embodiment includes a handle secured to a base channel member which is in turn secured to a base 162. The base channel member 163 has slidably positioned therein a slidably interconnected member 164. The base channel member 163 is formed with a planar bottom portion 165 and with channel member side walls 166 which are preferably parallel to one another and perpendicular to bottom portion 165.

The base 162 has a base upper surface 168 as well as a base lower surface 169. The slidably interconnected member 164 comprises a slide base 170 having an upper surface 171 and a lower surface 172 as well as slide side walls 174. Slide side walls 174 are preferably parallel to one another and perpendicular with respect to slide base 170. The width of the slidably interconnected member 164 is slightly less than the width of the base channel member 163 such that the slidably interconnected member 164 can slide therethrough.

In this third embodiment of the invention, a handle 175 preferably has a pair of handle side walls 176 and a slide transversing member 177. The pair of handle side walls 176 are secured to the base channel member 163 and extend downwardly from the slide transversing member 177 such that the bottom portion of the handle side walls 176 is disposed between the base channel member side walls 166 and the slide base side wall 174. The slide transversing member is preferably of a relatively planar, rectangular configuration.

Located in each of the side walls of the slide side wall 174 is a slot 183 through which a slot engaging means 185 passes. The slot engagement means 185 has its one end secured to the handle side wall 176, such that as the handle 175 is pivoted about pivot pin 187, the slot engagement means 185 is forced against slot wall 194, thereby moving slidable member 164 and performing the disconnection. Additional manual movement of slidable member 164 can be obtained after disconnection along slot 183 for accessibility to the connector second part. The pivoting occurs in the handle engaging portion 188 of the channel member side wall.

Means are provided in the form of projections 190 which extends upwardly from the upper surface of slide base 170 to secure the connector second part 191 to the slide base 170. Similarly fastening means 192 are provided for securing the base to the connector first part 193.

In the actual operation of this embodiment, with reference to FIGS. 12, 15 and 16, the connector first part is secured to the base by fastening means 193. The connector second part 191 is placed over the projections 190 at the approximate position shown by 191'. The handle at this time is about in the location shown by the dashed line 160'. The slot engagement means and the slot are in the positions 185' and 183' respectively. Manual force is then preferably applied to the slide base and connector second part until the connector first and second parts are adjacent one another. The slide base and connector second part are preferably in positions 170" and 191" respectively.

The handle 160' may then be pivoted about pivot pin 187 to the position shown in FIGS. 12 and 15 by longitudinally displacing the slide base within the base channel member 163, during which pivoting the slot engagement means 185 passes along slot 183 until it comes to the end. Additional manual force may then be applied to the slide base and connector second part until a secure joining is made between the connector first part and second parts. The slide base and connector second part are preferably in positions 170 and 191 respectively, with the slot engagement means and the slot being in positions 185 and 183 respectively.

Similarly, to effect disengagement of the battery connectors, grasping the handle 175 and pulling so as to pivot the handle to the position shown in 160', disconnects the electrical circuit. At this point, the slide base formerly at position 170 is approximately in the position shown in 170" and the connector second part formerly at position 191 is in the approximate position shown by 191", which position is disconnected. To effect removal of the connector second part from the unit, the slide base is then preferably manually moved away from connector first part 193 as slot engagement means 185 moves along slot 183 so as to permit the connector second part to be lifted from projection 190, approximately at position 191' with the slide base then being at position 170'. It should also be appreciated that although there is a slight arcuate path associated with the movement of slot engagement means 185, the space between the bottom portion 165 and the lower surface 172 permit the slide base to essentially float to a limited degree within the base channel member 163.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a battery powered vehicle, a method of disconnecting a replaceable battery from the vehicle wherein the battery is provided with an industry standard electrical connector and the vehicle is provided with a complementary electrical connector, the method comprising the steps of securing the vehicle electrical connector in fixed relation to the vehicle, placing the battery connector over at least one force transmitting beam permanently secured to and carried by a force transferring device permanently associated with the vehicle to assist in disconnecting the battery connector and the vehicle connector, and manipulating the force transferring device to disconnect the battery connector from the vehicle connector.

2. A method of connecting and disconnecting a replaceable battery from a battery powered vehicle wherein the battery is provided with an electrical connector having openings formed therein and wherein the vehicle is provided with a complementary electrical connector, the method comprising the steps of securing the vehicle electrical connector in fixed relation to the vehicle, placing the battery electrical connector over at least one force transmitting beam permanently secured to and carried by a force transferring device permanently associated with the vehicle, whereby the beam extends into one of the battery electrical connector openings, and manipulating the force transferring device to move the battery connector longitudinally of its axis to connect and disconnect the battery electrical connector from the vehicle electrical connector.

3. A method of connecting to and disconnecting a replaceable battery from a battery powered vehicle wherein the battery is provided with an electrical connector having a pair of openings aligned longitudinally of the connector and wherein the vehicle is provided with a complementary electrical connector, the method comprising the steps of securing the vehicle electrical connector in fixed relation to the vehicle, placing the openings in the battery connector over a pair of longitudinally aligned force transmitting beams permanently secured to and carried by a force transferring device permanently associated with the vehicle, and manipulating the force transferring device to move the battery connector longitudinally of its axis to connect and disconnect the battery electrical connector from the vehicle electrical connector.

4. An apparatus for connecting and disconnecting a replaceable battery and a battery powered vehicle wherein the battery is provided with an electrical connector having openings formed in the connector and wherein the vehicle is provided with a complementary electrical connector, said apparatus including means for securing the vehicle electrical connector in fixed relation to the vehicle, force transferring means permanently associated with the vehicle including at least one force transmitting beam permanently secured to and extending therefrom for engagement with the openings in the battery electrical connector, and means for manipulating the force transferring device thereby to move the battery connector longitudinally of its axis to connect and disconnect the battery electrical connector from the vehicle electrical connector.

5. The apparatus of claim 4 wherein the openings formed in said battery electrical connector are a pair of longitudinally aligned openings on the central axis of the connector and wherein said force transferring means includes a pair of smooth sided force transmitting beams for engaging said pair of openings.

6. A battery connector assist unit for use with a battery connector having a first part and a second part, the first part being connected to a vehicle side of the battery connector, the second part being connected to a battery side of the battery connector, said battery connector assist unit comprising a base, said base having means for securing thereto the first part of the battery connector, a slidable member interconnected to said base, said slidable member having a handle member and a slide base, said slide base having an upper surface and a lower surface, said lower surface being adjacent said base, said slidable member being slidable over said base responsive to force exerted on said handle member, said slidable member having means for slidably retaining thereon the second part of the battery connector, said means for retaining the second part including at least one beam permanently secured to and extending perpendicularly from said upper surface.

7. A battery connector assist unit as claimed in claim 6 wherein said base includes means forming at least one slot therein, and wherein said slidable member includes means for engaging said slot for maintaining alignment between said base and said slidable member.

8. A battery connector assist unit as claimed in claim 7 wherein said base includes means for aligning a battery connector first part with a battery connector second part.

9. A battery connector assist unit as claimed in claim 8 wherein said slidable member has side walls, said side walls being spaced apart enough to accommodate a battery connector second part therebetween.

10. A battery connector assist unit as claimed in claim 8 wherein said slidable member is located directly adjacent said base.

11. A battery connector assist unit as claimed in claim 8 wherein said base has a cover plate attached thereto a spaced distance above said base, said cover plate being in a closed position parallel to said base, the first and second parts of the battery connector able to be engaged in operative relationship when said cover plate is in its closed position.

12. A battery connector assist unit as claimed in claim 11 wherein said base has means for regulating the closure of said cover plate.

13. A battery connector assist unit as claimed in claim 8 wherein said slidable member includes means for aligning a battery connector second part with a battery connector first part.

14. In a system having a battery powered vehicle, a battery, battery cable, a battery connector having a first part and a second part, the first part being connected to a vehicle, the second part being connected to a battery, and a battery connector assist unit, wherein the improvement comprises the battery connector assist unit comprising a base, said base having means for securing thereto the first part of the battery connector, and a slidable member interconnected to said base, said slidable member having a handle member and a slide base, said slide base having an upper surface and a lower surface, said lower surface being adjacent said base, said slidable member being slidable over said base responsive to force exerted on said handle member, said slidable member having means for slidably retaining thereon the second part of the battery connector, said means for retaining the second part including at least one beam permanently secured to and extending perpendicularly from said upper surface.

15. A system as claimed in claim 14 wherein said slidable member includes means forming at least one slot therein, said base having means for engaging said slot for maintaining alignment between said base and said slidable member, and said base includes means for aligning a battery connector second part with a battery connector first part.

16. A system as claimed in claim 14 wherein said base has at least one slot therein, and a cover plate a spaced distance above said base, said cover plate being in a closed position parallel to said base, the first and second parts of the battery connector able to be engaged in operative relationship when said cover plate is in its closed position.

17. A battery connector assist unit comprising a vertical base, means for fixedly securing thereto a first side of a battery connector and means for engaging a slot, and a slidable member interconnected to said base, said slidable member having a handle member, said slidable member being slidable along a vertical axis, said slidable member having at least one slot engageable with said slot engaging means, and said slidable member having means for slidably retaining thereon a battery side of a battery connector, said retaining means including at least one beam permanently secured to and extending from said slidable member.

18. A battery connector assist unit as claimed in claim 17 wherein said means for securing said first side of a battery connector is positioned to permit said first side of the battery connector to be aligned with the battery side of a battery connector.

19. A battery connector assist unit as claimed in claim 17 which includes a first and second connector alignment means, said first and second connector alignment means being of different thicknesses, the thickness of the first connector alignment means being greater than that of the second connector alignment means.

20. A battery connector assist unit as claimed in claim 17 wherein said handle member is atop said slidable member.

21. A battery connector assist unit as claimed in claim 20 wherein said handle member includes a cavity therein, said cavity being of a width sufficient to permit the passage therethrough of a battery cable.

* * * * *